United States Patent Office 2,768,230
Patented Oct. 23, 1956

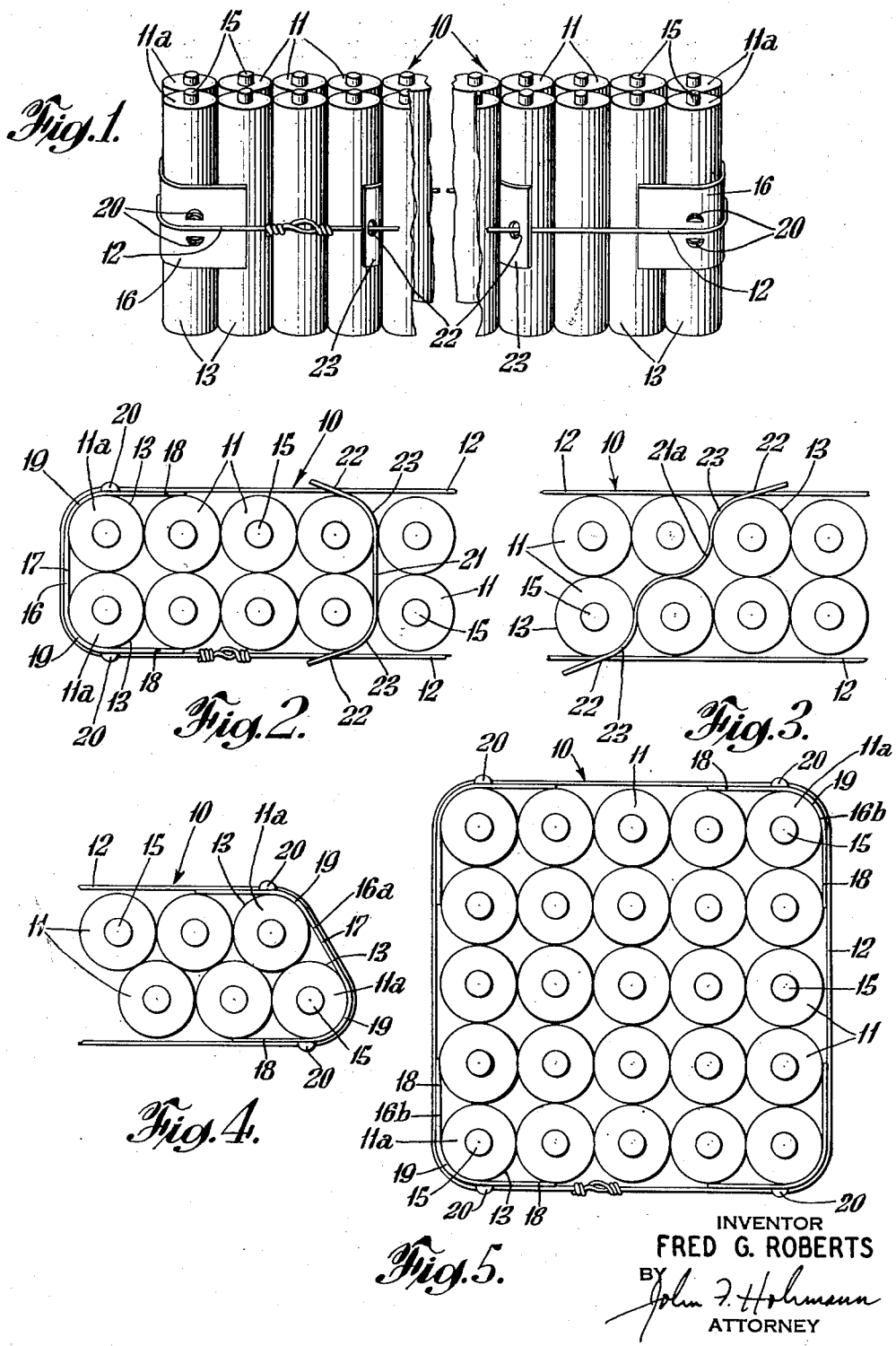

2,768,230

BATTERY ASSEMBLY AND ATTACHMENT THEREFOR

Fred G. Roberts, Lakewood, Ohio, assignor to Union Carbide and Carbon Corporation, a corporation of New York Application May 26, 1954, Serial No. 432,560

7 Claims. (Cl. 136—173)

This invention relates to a method of assembling battery cells, and more particularly concerns an improved method of electrically and mechanically joining battery cells together.

In electrically connecting battery cells in parallel, the usual practice is to solder connecting wires to the proper cell terminals to form the desired electrical circuit. Because the heat of soldering as conventionally practiced may seriously curtail proper cell functioning, and because soldering is a costly and time-consuming operation, it is desirable to connect numerous cells in parallel hook-up by means other than soldering. Moreover, the soldered connections are subject to being easily broken due to relative movement between the battery cells and impact with other articles.

It is, therefore, an object of the present invention to provide an improved method of assembling battery cells to form a part of an electrical connection.

Another object of the present invention is to provide an improved cell connector, which serves to mechanically and electrically connect the cells of a battery in different cell arrangements.

Yet another object of the present invention is to provide a battery attachment which is easy to assemble, cheap to make, and which is of rugged construction.

In the accompanying drawing is shown an embodiment of the invention. In this drawing:

Fig. 1 is a perspective view of a battery assembled in accordance with the principles of the invention;

Fig. 2 is an enlarged plan view of part of the battery assembly shown in Fig. 1;

Fig. 3 is an enlarged plan view of part of the battery shown in Fig. 1, but showing a modified cross strip;

Fig. 4 is an enlarged plan view of a portion of a battery assembled in staggered relation in accordance with the principles of the invention; and Fig. 5 is a plan view of another battery arrangement illustrating the principles of the invention.

According to this invention, a battery unit 10 comprising a number of cells 11 is formed by grouping the cells in a desired cell arrangement. In the drawing, Fig. 1, twenty cells are illustrated, but a smaller or larger number may be used. The cells are then fastened together by an encircling tape of suitable metallic material, preferably a binding wire 12, the binding material being of sufficient length to completely encompass a large number of battery cells.

The particular shape of the invidual cells forms no part of this invention, and the same is, therefore, described only to the extent necessary for a complete decription of the invention. As shown in Fig. 1, each of the cells 11 comprises a conventional cell having an outer cell wall 13 and a cell cap 15 as cell terminals.

For the purpose of protecting the corner cells 11a, of the battery unit 10, and to preserve the shape of the battery unit, a protecting strip 16 is interposed between each of the corner cells 11a, and the binding wire 12.

The protecting strip 16 is generally, though not necessarily, an angulated member formed from a substantially elongated, relatively stiff, electrically conductive metallic material such as Phosphor bronze. In Figs. 1 and 2, the protecting strip 16 is U-shaped. In Fig. 4 is shown a modified U-shaped protecting strip 16a adapted for use in a staggered arrangement of battery cells. Fig. 5 discloses a generally V-shaped protecting strip 16b in the form of a right angle. Referring to Fig. 2, the strip 16 comprises a central or bight portion 17, and a pair of flat terminal portions or extensions 18, the bight 17 having a transversely curved portion 19 adjacent its joinder with each of the extensions 18. The connecting portion 19 has a transverse curvature substantially similar to the radius of curvature of the cell wall 13 of the corner cell 11a, so that in assembly with the battery unit 10, the inner surface of the connecting portion 19 nests against the wall 13 of the associated corner cell 11a, and bight 17 and the extension 18 are respectively in tangential, restraining contact with the walls of the cells on opposite sides of said corner cell.

Projecting from the outer convex surface of each protecting strip 16 is a pair of oppositely facing, struck-out lugs or wings 20, which wings form a guideway for the reception and retention of the encompassing wire 12.

For strengthening the battery unit, one or more cross strips 21 may be provided. These cross strips 21 are made of electrically conductive metal, and are of suitable gage thickness to impart a reasonable degree of stiffness thereto. Each of the cross strips 21 is made from a strip of material which is substantially rectangular in shape and transversely curved at the terminal portions 23 thereof so as to conform to the radius of curvature of the cell walls 13 it may engage. Openings 22 are provided in each of the terminal portions of the cross strip 21 to receive therethrough the binding wire 12. Thus, in assembly, the cross strip 21 traverses the battery unit 10 in a sinuous path between the cell walls 13 of adjacent cells 11. In the illustration shown in Figs. 1 and 2, the terminal portions 23 may be disposed in oppositely facing and opposed relation, or, see Fig. 3, in oppositely facing directions, but forming a generally stepped-shaped cross strip 21a. Any number of cross strips 21 may be used in the battery unit 10, two being illustrated in the drawing.

When the cells are connected in parallel, the bare cells are grouped in the desired cell pattern 10, and fastened together by looping the binding wire 12 around the protecting strips 16 at the ends of the cell assembly, and through the cross strip 21, the wings 20 and the cross strip openings 22 serving to facilitate the assembly. Twisting of the overlapping ends of the wire 12 until the cells are in non-slip engagement with each other assures the permanency of the fastening. The extensive surface contact provided by the cell walls 13 and the multiple current paths of the bound assembly provide a suitable low-resistance electrical connection to form part of the parallel circuit.

When the invention is employed merely for the purpose of holding the cells in fixed assembly, or for other reasons, the insulating covers of the cells may be employed if so desired.

The invention is applicable to primary or storage batteries of all voltages, and may be employed in situations in which it is required to maintain battery cells within a common case or in a fixed position, or to fit in a particular space.

What is claimed is:

1. A battery attachment for electrically and mechanically joining an assembly of uninsulated battery cells into a predetermined battery arrangement to provide a common connection for a parallel circuit, the attachment comprising a loop of binding wire of sufficient length to encircle the battery assembly, and a plurality of protective strips interposed between the battery assembly and said wire, each of said protective strips having at least one arcuate portion and a pair of flat, terminal portions, whereby, in assembly, said arcuate portion of each of said strips nests respectively against certain of the cell walls of the battery assembly and said terminal portions are in substantially tangentially restraining relationship with the cells adjacent said certain cells.

2. In the attachment of claim 1, said protective strips being generally U-shaped.

3. In the attachment of claim 1, said protective strips being generally V-shaped.

4. In the attachment of claim 1, each of said protective strips having a pair of closely spaced, struck-out wings forming a guideway for the reception of said wire loop.

5. In the attachment of claim 4, a plurality of sinuously formed battery strengthening strips disposed conformably among the battery cells and traversing the battery assembly, each of said strengthening strips having an opening at each end thereof for receiving therethrough opposite sides of said wire loop.

6. A dry cell battery pack comprising a plurality of cells having bare cell cans, a loop of binding wire of sufficient length to encircle the battery cells, a plurality of generally angle-shaped protective strips interposed between said cells and said wire, each of said protective strips having an arcuate medial portion and a pair of flat divergent terminal portions integral therewith, whereby, in assembly, the arcuate portion of each of said strips nests respectively against certain of the cell cans of the battery pack and said extensions are in substantially tangentially restraining relationship with the cells adjacent said certain cells, thereby the cell cans are held firmly in contact with each other to afford a common connection for a parallel circuit.

7. A dry cell battery pack comprising a plurality of cells, a loop of binding wire of sufficient length to encircle said cells, a plurality of generally angulated protective strips in conformable adjacency with the corner cells of said battery, and extensions on each of said strips for restraining relative movement of the cells adjacent said corner cells, said wire loop acting to firmly hold said strip and cells in assembled relation.

References Cited in the file of this patent
UNITED STATES PATENTS 2,042,806     Schulte _____ June 2, 1936